US009418458B2

(12) United States Patent
Chertok et al.

(10) Patent No.: US 9,418,458 B2
(45) Date of Patent: Aug. 16, 2016

(54) GRAPH IMAGE REPRESENTATION FROM CONVOLUTIONAL NEURAL NETWORKS

(71) Applicant: SUPERFISH LTD., Petah-Tikva (IL)

(72) Inventors: Michael Chertok, Raanana (IL); Alexander Lorbert, Givat Shmuel (IL)

(73) Assignee: SUPERFISH LTD., Petah-Tikva (IL)

( * ) Notice: Subject to any disclaimer, the term of this patent is extended or adjusted under 35 U.S.C. 154(b) by 0 days.

(21) Appl. No.: 14/987,479

(22) Filed: Jan. 4, 2016

(65) Prior Publication Data

US 2016/0196672 A1 Jul. 7, 2016

(30) Foreign Application Priority Data

Jan. 5, 2015 (IL) .......................................... 236596

(51) Int. Cl.
*G06K 9/00* (2006.01)
*G06T 11/20* (2006.01)
*G06K 9/66* (2006.01)
*G06T 7/00* (2006.01)

(52) U.S. Cl.
CPC ............... *G06T 11/206* (2013.01); *G06K 9/66* (2013.01); *G06T 7/0085* (2013.01)

(58) Field of Classification Search
None
See application file for complete search history.

(56) References Cited

U.S. PATENT DOCUMENTS

| 8,345,921 B1 * | 1/2013 | Frome | G06K 9/72 382/103 |
| 2010/0183217 A1 | 7/2010 | Seung et al. | |
| 2010/0266200 A1 | 10/2010 | Atallah et al. | |
| 2015/0278642 A1 * | 10/2015 | Chertok | G06N 3/02 382/156 |
| 2016/0086078 A1 * | 3/2016 | Ji | G06N 3/08 382/157 |
| 2016/0098844 A1 * | 4/2016 | Shaji | G06T 9/002 382/156 |
| 2016/0104053 A1 * | 4/2016 | Yin | G06K 9/00228 382/156 |

OTHER PUBLICATIONS

Krizhevsky et al., "ImageNet classification with deep convolutional neural networks", NIPS 2012.*
Strigl et al., "Performance and scalability of GPU-based convolutional neural networks", PDP 2010.*
Taigman et al., "DeepFace: closing the gap to human-level performance in face verification", CVPR 2014.*
Krizhevsky et al. "ImageNet Classification with Deep Convolutional Neural Networks." Proceedings from the Conf. on Neural Information Processing Systems, 2012 (9 pages).
Simonyan et al. "Deep Inside Convolutional Networks: Visualising Image Classification Models and Saliency Maps."http://arxiv.org/abs/1312.6034, 2013 (8 pages).
Zeiler et al.: "Visualizing and Understanding Networks"; http://arxiv.org/abs/1311.2901v3, 2013 (11 pages).

(Continued)

*Primary Examiner* — Soo Park
(74) *Attorney, Agent, or Firm* — Merchant & Gould P.C.

(57) ABSTRACT

A method for producing a graph representation of an input image, the method including the procedures of applying convolutional layers of a trained convolutional neural network on the input image, defining a receptive field of a last convolutional layer of the trained convolutional neural network as a vertex of the graph representation, defining a vector of a three dimensional output matrix of the last convolutional layer that is mapped to the receptive field as a descriptor for the vertex and determining an edge between a pair of vertices of the graph representation by applying an operator on a pair of descriptors respective of the pair of vertices.

5 Claims, 7 Drawing Sheets

(56) References Cited

OTHER PUBLICATIONS

Li et al.: "Heterogeneous Multi-task Learning for Human Pose Estimation with Deep Convolutional Neural Network"; http://arxiv.org/abs/1406.3474v1, 2014 (8 pages).

Turaga et al.: "Convolutional Networks Can Learn to Generate Affinity Graphs for Image Segmentation"; Neural computation, vol. 22, No. 2, Feb. 28, 2010, pp. 511-538.

Office Action issued in IL 236596, mailed Jun. 23, 2015 (6 pages).

* cited by examiner

GRAPH IMAGE REPRESENTATION FROM CONVOLUTIONAL NEURAL NETWORKS

FIELD OF THE DISCLOSED TECHNIQUE

The disclosed technique relates to image representation in general, and to methods and systems for representing an input image as a graph by applying a trained convolutional neural network on the input image, in particular.

BACKGROUND OF THE DISCLOSED TECHNIQUE

For many visual tasks, the manner in which the image is represented can have a substantial effect on both the performance and the results of the visual task. Convolutional neural networks (CNN) are known in the art. These artificial networks of neurons can be trained by a training set of images and thereafter be employed for producing multiscale representations of an input image.

An article by Krizhevsky et al., entitled "ImageNet Classification with Deep Convolutional Neural Networks" published in the proceedings from the conference on Neural Information Processing Systems 2012, describes the architecture and operation of a deep convolutional neural network. The CNN of this publication includes eight learned layers (five convolutional layers and three fully-connected layers). The pooling layers in this publication include overlapping tiles covering their respective input in an overlapping manner. The detailed CNN is employed for image classification.

An article by Zeiler et al., entitled "Visualizing and Understanding Convolutional Networks" published on http://arxiv.org/abs/1311.2901v3, is directed to a visualization technique that gives insight into the function of intermediate feature layers of a CNN. The visualization technique shows a plausible and interpretable input pattern (situated in the original input image space) that gives rise to a given activation in the feature maps. The visualization technique employs a multi-layered de-convolutional network. A de-convolutional network employs the same components as a convolutional network (e.g., filtering and pooling) but in reverse. Thus, this article describes mapping detected features in the produced feature maps to the image space of the input image. In this article, the de-convolutional networks are employed as a probe of an already trained convolutional network.

An article by Simonyan et al., entitled "Deep Inside Convolutional Networks: Visualizing Image Classification Models and Saliency Maps" published on http://arxiv.org/abs/1312.6034, is directed to visualization of image classification models, learnt using deep Convolutional Networks (ConvNets). This article describes two visualization techniques. The first one generates an image for maximizing the class score based on computing the gradient of the class score with respect to the input image. The second one involves computing a class saliency map, specific to a given image and class.

An article by Li et al., entitled "Heterogeneous Multi-task Learning for Human Pose Estimation with Deep Convolutional Neural Network" published on http://arxiv.org/abs/1406.3474, is directed to a method for estimating a pose of a human subject in an image. The method involves backtracking an output of a convolutional layer to the respective patch in the original input image. Specifically, the first convolutional layer receives the complete input image. However, subsequent middle layers are only locally connected therebetween (i.e., are not fully connected) and therefore the activation of some filters in the middle layers are affected by patches of the original input image. This publication suggests an algorithm for backtracking the filter output to the specific patch of the input image, which activated the filter.

Images can be represented as graphs for performing various visual tasks, such as determining image similarity, image retrieval, machine vision, and the like. Techniques for graph matching, for performing such tasks, are known in the art. Reference is now made to U.S. Pat. No. 8,818,106, issued to Chertok et al., and entitled "Method for Organizing a Database of Images and Retrieving Images from That Database According to a Query Image". This publication describes a method for determining a matching score between a first set of n1 feature points, and a second set of n2 feature points. The method includes the steps of producing a triple-wise affinity tensor, determining a leading eigenvector, iteratively producing a binary optimal assignment vector and determining a matching score. First the triple-wise affinity tensor is produced by ranking the affinity of the different triplets of feature points of each of the images. Specifically, the triple-wise affinity tensor details the affinity score of assignments of triplets of feature points of the first set of feature points and triplets of feature points of the second set of feature points. It is noted that the some triplet assignments can be preliminary neglected by considering the descriptors of the feature points. Then the leading eigenvector of the triple-wise affinity tensor is determined. The binary optimal assignment vector is produced by discretization of the leading eigenvector. Lastly, the matching score between the first set of feature points and the second set of feature points is determined according to the triple-wise affinity tensor and according to the optimal assignment vector. Other methods for solving an assignment problem, are also known in the art, for example, the Hungarian algorithm.

SUMMARY OF THE DISCLOSED TECHNIQUE

The disclosed technique overcomes the disadvantage of the prior art by providing a novel method for producing a graph representation of an input image. The method includes the procedures of applying convolutional layers of a trained convolutional neural network on the input image and defining a receptive field of a last convolutional layer of the trained convolutional neural network as a vertex of the graph representation. The method further includes the procedures of defining a vector of a three dimensional output matrix of the last convolutional layer that is mapped to the receptive field as a descriptor for the vertex and determining an edge between a pair of vertices of the graph representation. The edge is determined by applying an operator on a pair of descriptors respective of the pair of vertices.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1A:
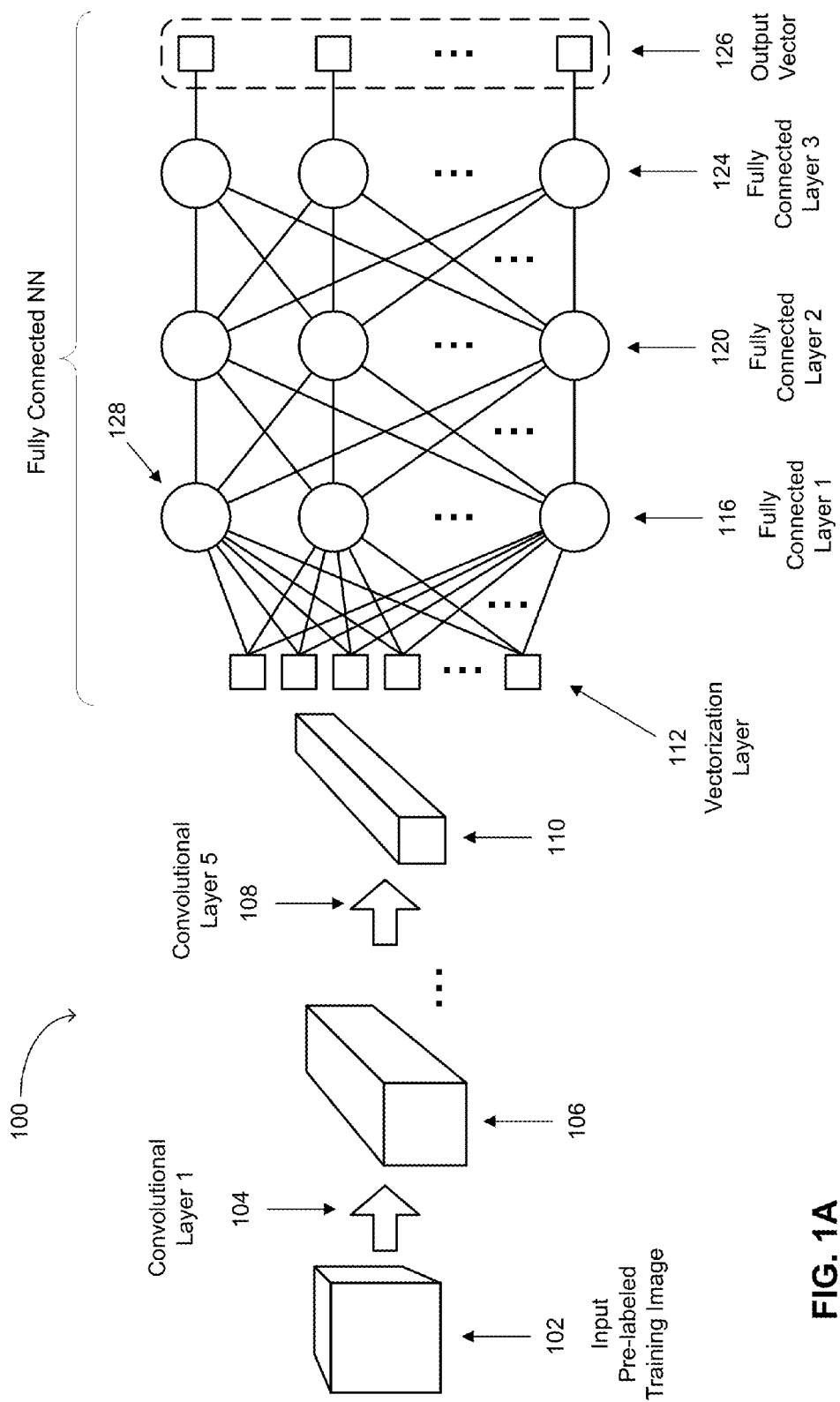
FIGS. 1A, 1B, 1C, 1D, 1E and 1F, are schematic illustrations of a convolutional neural network, constructed and operative in accordance with an embodiment of the disclosed technique.

Before describing the methods and systems of the disclosed technique, the following paragraph details matrix notations used throughout this application. A 3D matrix has three dimensions, for example, a horizontal dimension (X), a vertical dimension (Y) and a depth dimension (Z). A vector extending along one of the dimensions of the matrix would be denoted by its coordinates in the other two dimensions, and the capital letter of the dimension along which it extends. For example, a vector extending along (i.e., parallel to) the depth dimension (Z) would be denoted herein as (x coordinate, y coordinate, Z) or simply as (x,y,Z). For instance, looking at FIG. 1D, vector 172 is denoted as (1,1,Z), and vector 174 is denoted as (5,5,Z). Such a vector, extending along the Z dimension, is also referred to herein below as a Z vector. For example, (x,y,Z) is a Z vector extending along the Z dimension, and (x,Y,z) is a Y vector extending along the Y dimension.

The disclosed technique overcomes the disadvantages of the prior art by providing a method and a system for representing an input image as a graph (i.e., as a set of vertices and edges). The graph representation of the input image can then be employed for various visual tasks, such as determining image similarity, similarity-based image search, machine vision tasks, and the like. For example, the graph can be employed for determining image similarity by employing graph matching techniques.

For producing the graph image representation, a trained Convolutional Neural Network (CNN) is applied on the input image. In particular, the convolutional layers of the CNN are applied on the input image. That is, only the locally connected convolutional layers of the CNN are applied, while the fully connected layers are omitted. Thereby, the spatial locations of the neurons of the layers are maintained, and the receptive fields in the input image can be backtracked. A receptive field is a region in the input image which corresponds to a respective value in the feature map at the output of a convolutional layer. Alternatively, other layers of the CNN, besides the convolutional layers, are also applied. In any case, the receptive fields should be backtracked.

The CNN (i.e., the convolutional layers of the CNN) receives the input image as a Three Dimensional (3D) matrix. The applied CNN outputs a 3D output matrix. The X and Y dimensions of the output matrix indicate the location of a receptive field in the input image, and the Z dimension details the values given to that receptive field by the various filters of the last layer of the CNN. That is, a vector (n,m,Z) of the output matrix represents the set of values given by the various filters of the last convolutional layer to the receptive field indicated by the coordinates (n,m) in the input image. Therefore, the Z vector (n,m,Z) can serve as a descriptor to receptive field (n,m).

The output matrix is transformed into a set of vertices, each associated with a respective descriptor. These vertices define a graph representing the input image. The graph edges are determined by applying an operator (e.g., inner product or Gaussian kernel) on pairs of descriptor vectors (associated with pairs of vertices).

Figure 1B:
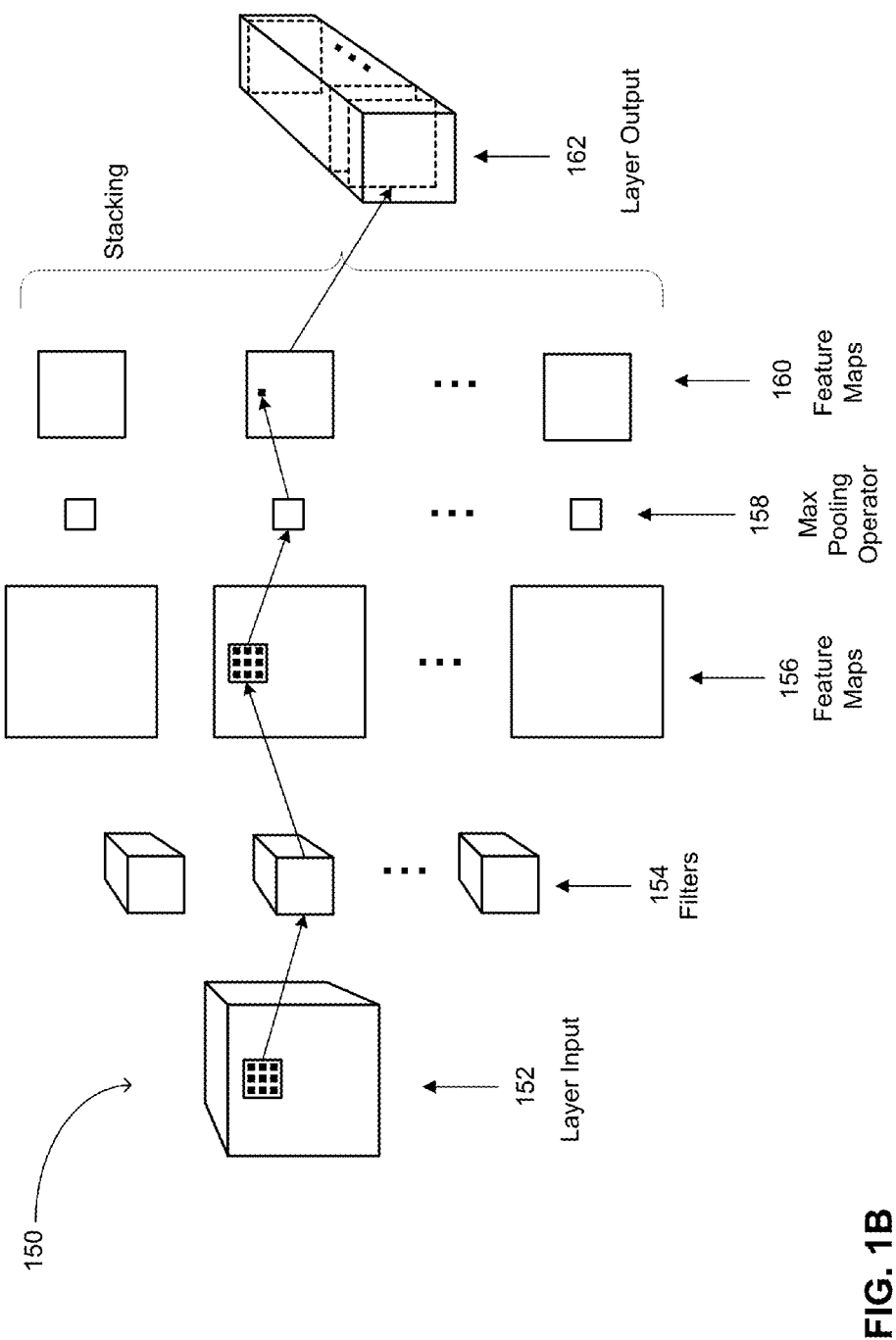
Figure 1C:
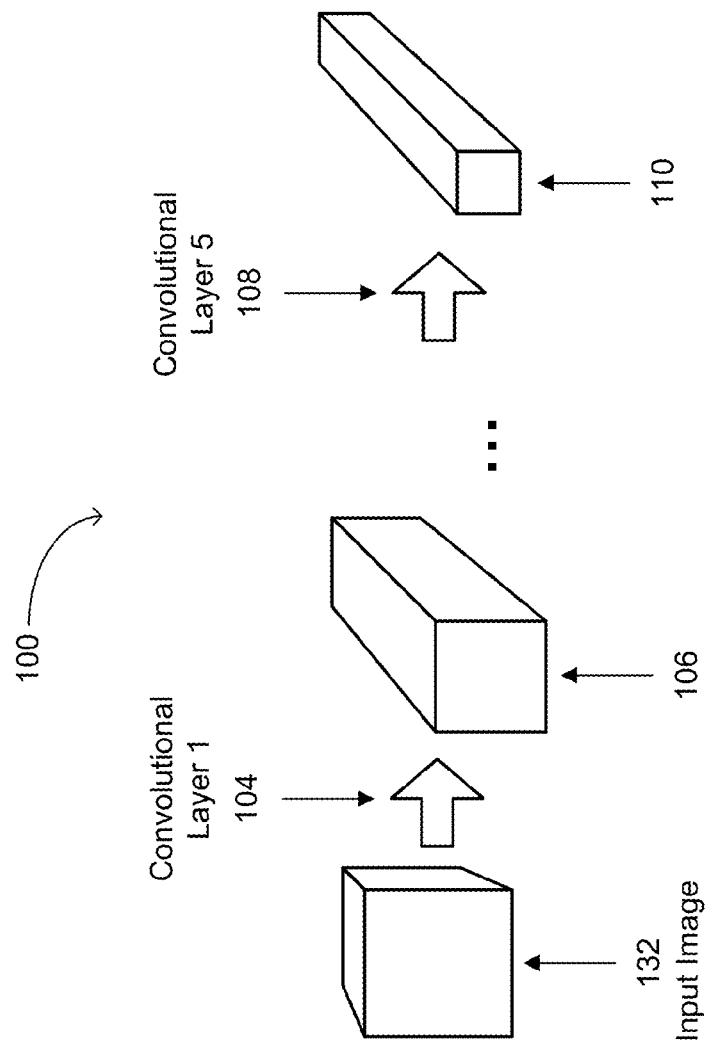
Figure 1E:
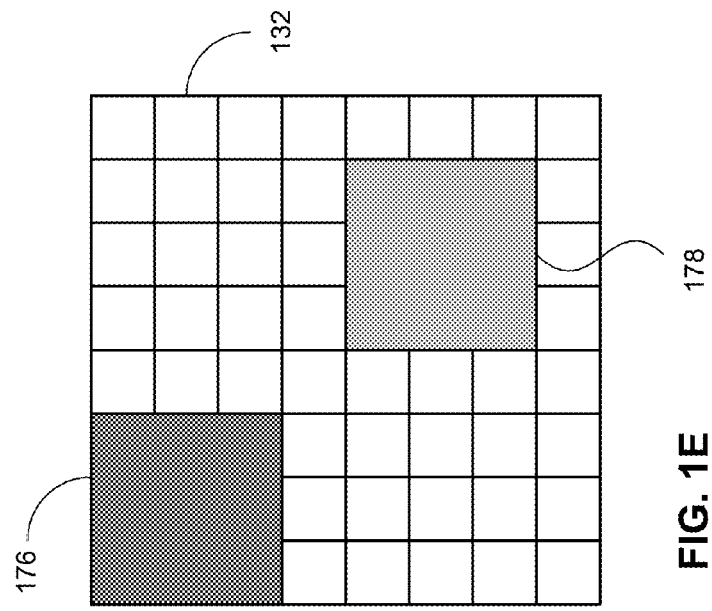
Figure 1D:
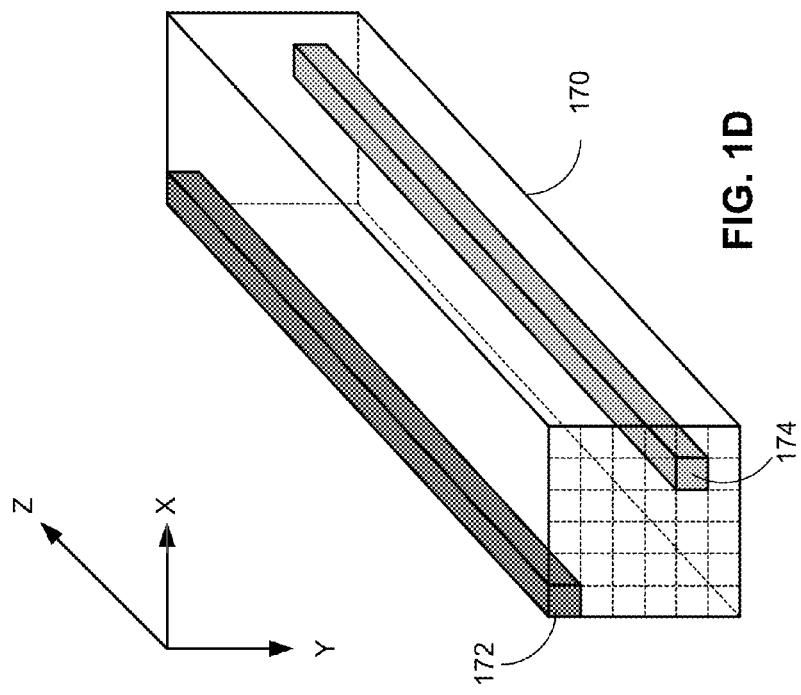
Figure 1F:
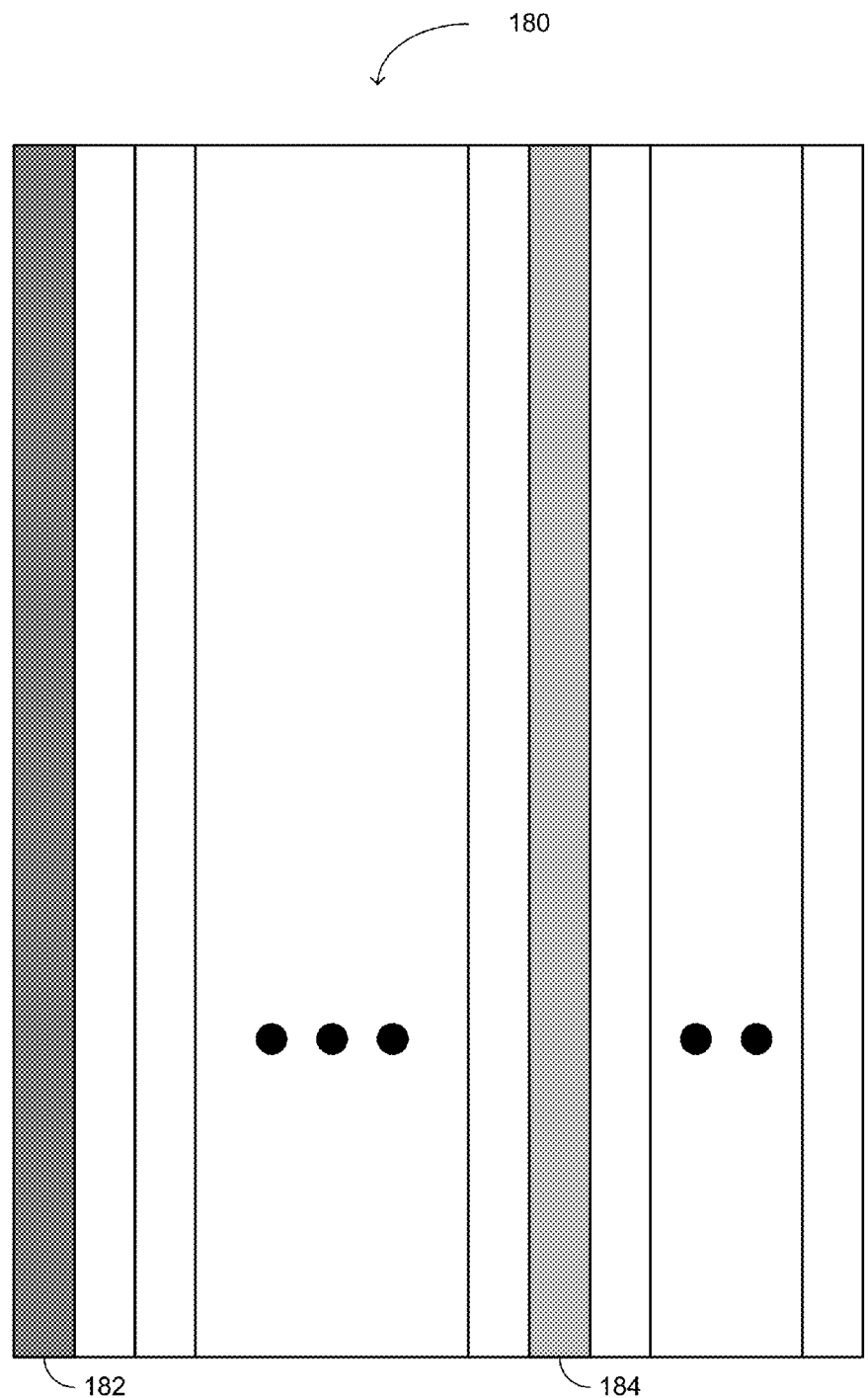

Reference is now made to FIGS. 1A, 1B, 1C, 1D, 1E and 1F, which are schematic illustrations of a Convolutional Neural Network (CNN), generally referenced 100, constructed and operative in accordance with an embodiment of the disclosed technique. FIG. 1A depicts an overview of CNN 100 as configured for the training stage thereof. FIG. 1B depicts a selected convolutional layer of CNN 100. FIG. 1C depicts the convolutional layers of CNN 100, without the fully connected layers, as applied on an input image for producing graph representation of the input image. FIG. 1D depicts the output 3D matrix of a convolutional layer of FIG. 1A. FIG. 1E depicts receptive fields in the input image respective of vectors with the output matrix of FIG. 1D. FIG. 1F depicts a 2D matrix produced from the output matrix of FIG. 1D.

With reference to FIG. 1A, CNN 100 includes an input image 102, followed by five convolutional layers of which only the first and the fifth are shown and are denoted as 104 and 108, respectively, and having respective outputs 106 and 110. It is noted that CNN 100 can include more, or less, convolutional layers. The output of fifth convolutional layer 110 is vectorized in vectorizing layer 112, and the vector output is fed into a layered, fully connected, neural network (not referenced). In the example set forth in FIG. 1A, in the fully connected neural network of CNN 100 there are three fully connected layers 116, 120 and 124—more, or less, layers are possible.

Each of fully connected layers 116, 120 and 124 comprises a variable number of linear, or affine, operators 128 (neurons) potentially followed by a nonlinear activation function. As indicated by its name, each of the neurons of a fully connected layer is connected to each of the neurons of the preceding fully connected layer, and is similarly connected with each of the neurons of a subsequent fully connected layer. Each layer of the fully connected network receives an input vector of values assigned to its neurons and produces an output vector (i.e., assigned to the neurons of the next layer, or outputted as the network output by the last layer). The last fully connected layer 124 is typically a normalization layer so that the final elements of an output vector 126 are bounded in some fixed, interpretable range. The parameters of each convolutional layer and each fully connected layer are set during a training (i.e., learning) period of CNN 100. Specifically, CNN 100 is trained by applying it to a training set of pre-labeled images 102.

The structure and operation of each of the convolutional layers is further detailed in the following paragraphs. With reference to FIG. 1B, the input to each convolutional layer is a multichannel feature map 152 (i.e., a three-dimensional (3D) matrix). For example, the input to first convolutional layer 106 (FIG. 1C) is an input image 132 represented as a multichannel feature map. Thus, for instance, a color input image may contain the various color intensity channels. The depth dimension of multichannel feature map 152 is defined by its channels. That is, for an input image having three color channels, the multichannel feature map would be an M×N×3 matrix (i.e., the depth dimension has a value of three). The horizontal and vertical dimensions of multichannel feature map 152 (i.e., the height and width of matrix 152) are defined by the respective dimensions of the input image. The input to subsequent layers is a stack of the features maps of the preceding layer arranged as 3D matrix.

Input multichannel feature map 152 is convolved with filters 154 that are set in the training stage of CNN 100. While each of filters 154 has the same depth as input feature map 152, the horizontal and vertical dimensions of the filter may vary. Each of the filters 154 is convolved with the layer input 152 to generate a feature map 156 represented as a Two-Dimensional (2D) matrix. It is noted that each filter 154 produces a selected element in output feature map 156 when applied on a respective region in input feature map 152.

Therefore, filters 154 maintain the spatial arrangement of input feature map 152, and thereby maintain the spatial arrangement of the input image.

Subsequently, an optional max pooling operator 158 is applied on feature maps 156 for producing feature maps 160. Max-pooling layer 158 reduces the computational cost for deeper layers (i.e., max pooling layer 158 serves as a sub-sampling or down-sampling layer). Both convolution and max pooling operations contain various strides (or incremental steps) by which the respective input is horizontally and vertically traversed. Lastly, 2D feature maps 160 are stacked to yield a 3D output matrix 162.

It is noted that a convolution layer can be augmented with rectified linear operation and a max pooling layer 158 can be augmented with normalization (e.g., local response normalization—as described, for example, in the Krizhevsky article referenced in the background section herein above). Alternatively, max pooling layer 158 can be replaced by another feature-pooling layer, such as average pooling layer, a quantile pooling layer, or rank pooling layer.

In the example set forth in FIGS. 1A and 1B, CNN 100 includes five convolutional layers. However, the disclosed technique can be implemented by employing CNNs having more, or less, layers (e.g., three convolutional layers). Moreover, other parameters and characteristics of the CNN can be adapted according to the specific task, available resources, user preferences, the training set, the input image, and the like. Additionally, the disclosed technique is also applicable to other types of artificial neural networks (besides CNNs).

Following the training stage, and for the rest of this application CNN 100 is also referred to as a trained CNN. The trained CNN is employed for producing a graph image representation of an input image (e.g., a query image for image for image retrieval task). In accordance with an embodiment of the disclosed technique, only a portion of CNN 100 is applied onto input images for deriving graph image representations. Specifically, only the convolutional layers are applied on the input image (i.e., the vectoriziation layer and the fully connected layers—the fully connected network—is omitted). Herein the applied convolution layers are also referred to as the trimmed CNN.

In accordance with another embodiment of the disclosed technique, only a portion of the convolutional layers can be applied (while omitting other convolutional layers) for example, the second, third and fourth convolutional layers are applied, and the first and fifth layers are omitted. In accordance with yet another embodiment of the disclosed technique, other layers, besides the convolutional layers, such as the fully connected layers (or at least some of the fully connected layers), can also be applied.

With reference to FIG. 1C, the convolutional layers of CNN 100 (also referred to as trimmed CNN 100) are applied onto an input image 132. As mentioned above, the convolutional layers maintain the spatial arrangement of the input image. Thus, an element in a feature map produced by a filter of a convolutional layer can be mapped back to a region in the input image. That region of the input image is also referred to as a receptive field. As further mentioned above, each of the convolutional layers produces a 3D output matrix composed of a stack of feature maps produced by the different filters of the layer. The 3D output matrix is fed as input to the subsequent layer, and the output of layer 108 (the final layer) is the output of the trimmed CNN. In the case that at least one fully connected layer is applied (i.e., applied on the output of a preceding convolutional layer), portions of the output of the fully connected layer should also be mapped back to respective regions in the input image.

With reference to FIGS. 1D and 1E, an output matrix 170 of CNN 100 (e.g., output 110 of fifth convolutional layer 108) has three dimensions, horizontal (X), vertical (Y) and depth (Z). Output matrix 170 is composed of a stack of 2D feature maps produced by the filters of the convolutional layer. Thus, the X and Y coordinates of matrix 170 relate to the location of a receptive field within the input image. The Z coordinate denotes a specific feature map. In other words, the Z coordinate denotes a specific filter of the convolutional layer, which produced that specific feature map when applied onto the receptive field denoted by the X and Y coordinates. Thus, each receptive field is associated with a Z vector (x,y,Z) indicating its location within the input image (x,y) and including a set of values received from the various filters of the convolutional layer.

It is noted that the receptive fields can be overlapping. In the example set forth in FIG. 1E, input image 132 is depicted as an 8×8 2D matrix (the depth channel of input image, representing for example the color intensities of each pixel, is omitted for the sake of brevity). A first receptive field 176, and a second receptive field 178 are 3×3 pixel patches. The overlap between receptive fields during convolution with the filters of the convolutional layer is 2 pixels. Thus, the coordinates of receptive field 176 are (1,1) and the coordinates of receptive field 178 are (5,5).

The receptive fields of the last convolutional layer are determined by backtracking the output of the last convolutional layer to respective image patches of the input image. The backtracking is performed, for example, by the back tracking algorithm described herein above in the background section with reference to the Li publication. Alternatively, the backtracking can be performed by back propagation through the trimmed CNN (i.e., through the convolutional layers) for determining the receptive fields, for example, as in the back propagation techniques described herein above in the background section with reference to the Simonyan publication.

As mentioned above, each vector extending along the Z dimension of output matrix 170 is a vector of values produced by applying the filters of the convolutional layer onto the receptive field indicated by the X and Y coordinates of the vector. For example, vector 172 is a stack of values produced when applying the filters of the convolutional layer onto receptive field 176 indicated by (1,1,Z). Vector 174 is a stack of values produced when applying the filters of the convolutional layer onto receptive field 178 indicated by (5,5,Z). The vectors extending along the Z dimension are also referred to herein as Z vectors. Each Z vector can be employed as a descriptor for the respective receptive field. For example, vector 172 serves as a descriptor for receptive field 176, and vector 174 serves as a descriptor for receptive field 178. That is, the values received by a receptive field when applied with the filters of the convolutional layer serve to describe (are employed as a descriptor for) that receptive field.

With reference to FIG. 1F, a 2D matrix 180 is produced by arranging the Z vectors of output matrix 170 (FIG. 1D) in a 2D array. Each column of matrix 180 is a Z vector. For example, column 182 is vector 172 (1,1,Z), and column 184 is vector 174 (5,5,Z). The graph representation of the input image is produced by employing the receptive fields of the last convolutional layer as vertices of the graph representation of the input image. Each vertex is associated with a descriptor (i.e., the respective Z vector). The edges are determined as the inner product between two vertices, or by applying another operator on two vertices, such as a Gaussian kernel.

In accordance with another embodiment of the disclosed technique, the locations (i.e., the X and Y coordinates) of each vertex (i.e., each Z vector) are also employed for determining the edges. For example, the edge can be determined as the inner product of the vertices graphs factored or scaled by the distance between the vertices locations.

It is noted that the receptive fields are a property of the trimmed CNN (and possibly of the backtracking method), and are not dependent on the input image. That is, the receptive fields of the last convolutional layer are the same for every input image. Therefore, every input image would have the same number of vertices and the size of descriptor vectors for the vertices.

Figure 2:
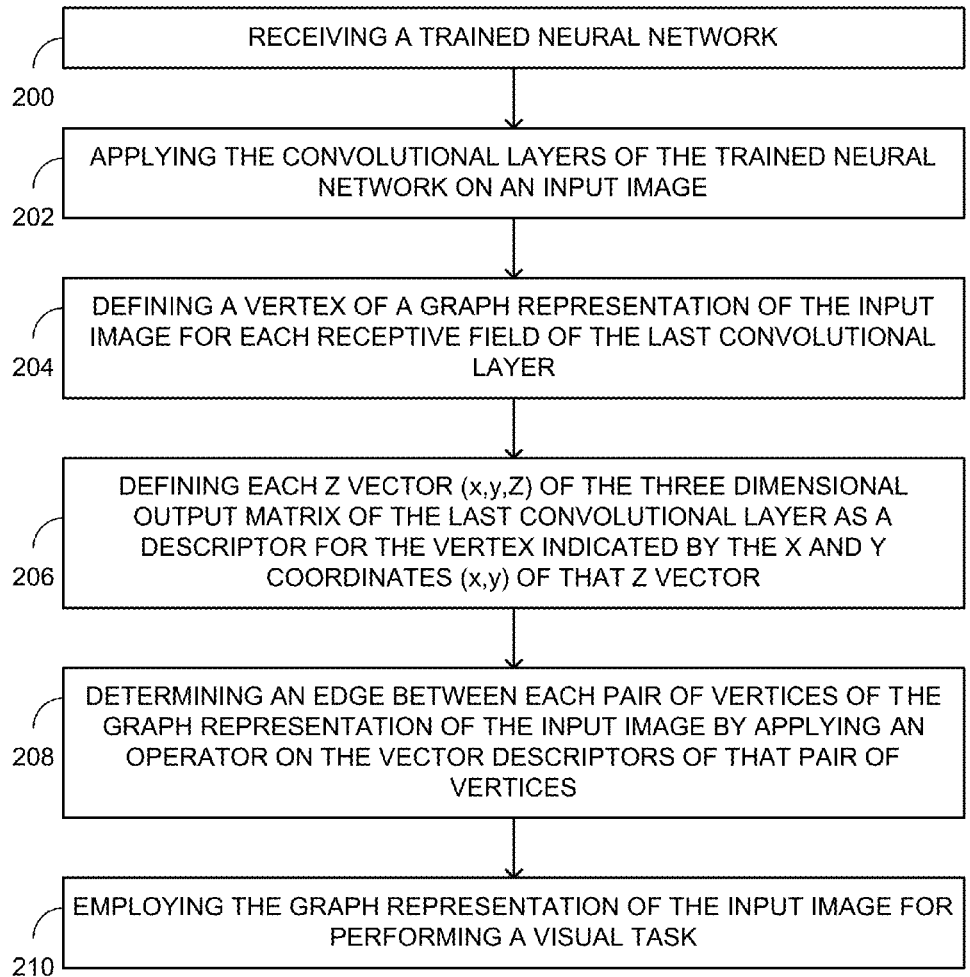
FIG. 2 is a schematic illustration of a method for representing an input image as a graph by applying a trimmed convolutional neural network on the input image, operative in accordance with another embodiment of the disclosed technique.

Reference is now made to FIG. 2, which is a schematic illustration of a method for representing an input image as a graph by applying a trimmed convolutional neural network on the input image, operative in accordance with another embodiment of the disclosed technique. In procedure 200, a trained Neural Network (e.g., a trained Convolutional Neural Network—CNN) is received. With reference to FIG. 1A, CNN 100 is received after being trained with a training set.

In procedure 202, the convolutional layers of the CNN (i.e., the trimmed CNN) are applied on an input image. The trimmed CNN includes only convolutional layers omitting the fully connected layers, and is therefore termed trimmed network. In accordance with other embodiments of the disclosed technique, the term trimmed network can also be applied to a network omitting additional or other layers. For example, a trimmed network can include the first, second and fifth convolutional layers, omitting the third and the fourth layers.

In accordance with an alternative embodiment of the disclosed technique, at least one fully connected layer is also applied. In any case, the output of the last applied layer, or of each layer which is employed for producing a graph representation should be mapped back (i.e., backtracked) to a respective region of the input image. For example, in the case that first fully connected layer 116 (FIG. 1) is also applied on the input image, the output of fully connected layer 116 is backtracked to the output of fifth convolutional layer 108, and serves as an additional layer (i.e., additional 2D feature maps) in the 3D output of convolutional layer 108.

The input image conforms to the expected input dimensions of the trained CNN. As such, the input image may require resizing and cropping, for example, for adapting it to the input dimensions of the CNN. Additionally, a pixel-based mean image, as determined in the training phase (i.e., mean image of the image training set), may be subtracted from the input image. In general, the input image has to undergo the same (or similar) preprocessing, which was applied to every image when training the neural network. The input image is inputted into the trimmed CNN as a multichannel feature map represented by a 3D matrix. The applied convolutional layers produce a 3D output matrix (i.e., each layer produces a 3D output matrix fed into the subsequent layer, and the last layer produces the 3D output matrix that is considered as the output of the trimmed CNN). With reference to FIG. 1C, the convolutional layers of CNN 100 (e.g., layers 104 and 108) are applied on input image 132.

In procedure 204, a vertex of a graph representation of the input image is defined for each receptive field of the last convolutional layer. As with any graph, the graph representing the input image includes a set of vertices and a set of edges connecting those vertices. The vertices are defined by the receptive fields of the last convolutional layer. Specifically, a vertex is defined for each receptive field. For example, in the case that the input image is divided by the last convolutional layer into 36 receptive fields arrayed in an overlapping array of 6×6, the graph representing the input image would include 36 vertices.

The receptive fields of the last convolutional layer are determined by backtracking as detailed herein above with reference to FIGS. 1D and 1E. Each receptive field is indicated by a pair of coordinates (x,y). Each element in the feature maps produced by the filters of the last convolutional layer can be mapped to a respective receptive field. Therefore, each Z vector in the stack of feature maps (the 3D matrix) at the output of the last convolutional layer is also mapped to a respective receptive element. Both the Z vector and the respective receptive element are indicated by the same (x,y) coordinates. In particular, Z vector (x,y,Z) of the output matrix of the last convolutional layer is mapped back to receptive field (x,y) in the input image. With reference to FIGS. 1D and 1E, the receptive fields for the last convolutional layer are defined as vertices of a graph (not shown) representing input image 132. For example, receptive field 176 and 178 are defined as vertices indicated by (1,1) and (5,5), respectively.

In procedure 206, each Z vector (x,y,Z) of the 3D output matrix of the last convolutional layer is defined as a descriptor for the vertex indicated by the X and Y coordinates (x,y) of that Z vector. The X and Y dimensions of the output matrix indicate the X and Y coordinates of a respective receptive field within the input image. Thus, in the case that the input image is divided by the last convolutional layer into 36 receptive fields arrayed in an overlapping array of 6×6, the X and Y dimensions of the output matrix would be 6, and the output matrix would be a 6×6×Z matrix.

The Z coordinate of the output matrix indicates a filter of the last convolutional layer. Thus, in the case that the last convolutional layer has 256 filters, the depth of the output matrix would be 256, and the output matrix would be a 6×6×256 matrix. Each Z vector (x,y,Z) is composed of a set of values received for the receptive field, indicated by coordinates (x,y), from each of the filters of the last convolutional layer. Thus, the element (x,y,z) of the output matrix represents the value given to specific receptive field (x,y) by a specific filter (z). The Z vector (x,y,Z) can serve as a descriptor for the vertex defined for receptive field (x,y). Thereby, the graph representation of the input image includes X-by-Y vertices (i.e., depending on the dimensions of the output matrix). Each vertex is described (or is associated with) a descriptor defined by the values given by the various filters of the last convolutional layer to the respective receptive field.

With reference to FIGS. 1D and 1E, vector (1,1,Z) indicated by reference numeral 172 is defined as a descriptor for the receptive field (1,1) that is indicated by reference numeral 176. Thus, vector 172 serves as a descriptor for the vertex defined for receptive field (1,1). Vector (5,5,Z) indicated by reference numeral 174 is defined as a descriptor for the vertex defined for receptive field (5,5).

In procedure 208, an edge between each pair of vertices of the graph representation of the input image is determined by applying an operator on the vector descriptors of that pair of vertices. As described herein above with reference to procedures 204 and 206, a vertex of the graph representation of the input image is defined for a receptive field indicated by (x,y) coordinates, and is associated with (is described by) a descriptor defined a by Z vector (x,y,Z). The edges of the graph that represents the input image are determined by applying an operator on the Z vectors of the vertices. For example, an edge between vertices $(x_1,y_1)$ and $(x_2,y_2)$ is determined by the inner product of vectors $(x_1,y_1,Z)$ and $(x_2,y_2,Z)$. That is, the edge is given by $(x_1,y_1,Z) \leftrightarrow (x_2,y_2,Z)$. Alternatively, other operators can be employed for determining the edges of the graph, such as a Gaussian kernel. With reference to FIGS. 1D and 1E, the edge between vertices defined for receptive fields 176 and 178 is given by the inner product of vectors 172 and 174.

In procedure 210, the graph representation of the input image is employed for performing a visual task. The input image is represented by a graph which vertices are defined by the receptive fields of the last convolutional layer, and which edges are given by applying an operator on the vector descriptors of the vertices. The graph representation of the input image enables performing various visual tasks on the input image, such as determining image similarity, image retrieval, machine vision, and the like. For example, for determining similarity between a pair of selected images, the graphs representing the images are compared, and the graph similarity defines the image similarity. Methods for graph matching (determining graph similarity) are described in the Chertok reference mentioned herein above in the background section.

Figure 3:
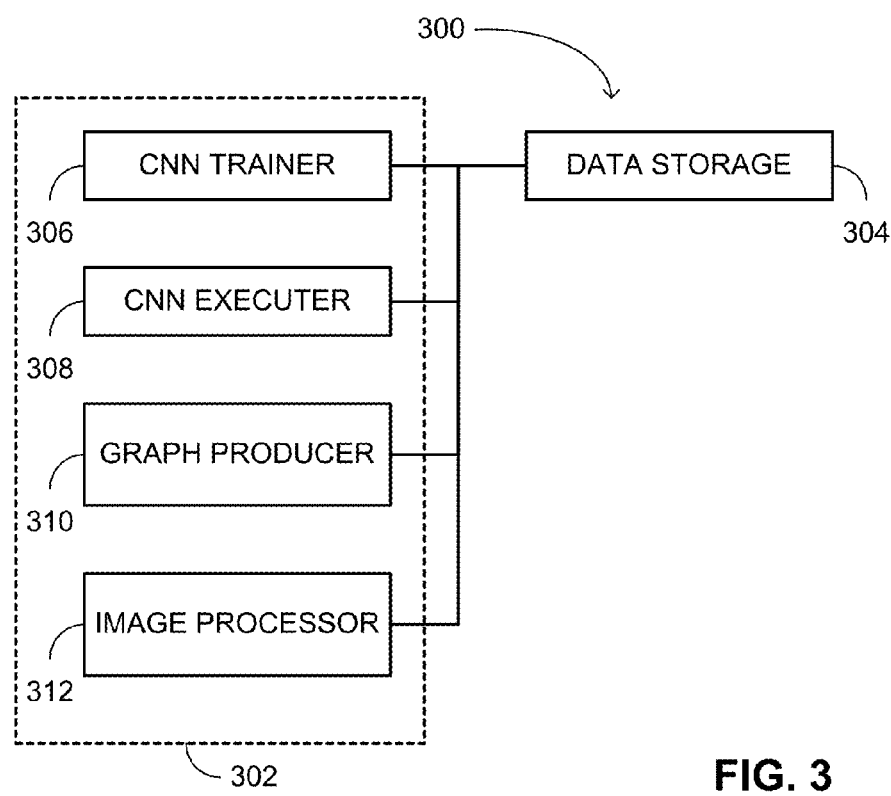
FIG. 3 is a schematic illustration of a system for representing an input image as a graph by applying a trained convolutional neural network on the input image, constructed and operative in accordance with a further embodiment of the disclosed technique.

Reference is now made to FIG. 3, which is a schematic illustration of a system, generally referenced 300, for representing an input image as a graph by applying a trained convolutional neural network on the input image, constructed and operative in accordance with a further embodiment of the disclosed technique. System 300 includes a processing system 302 and a data storage 304. Processing system 302 includes a plurality of modules. In the example set forth in FIG. 3, processing system 302 includes a CNN trainer 306, a CNN executer 308, a graph producer 310 and an image processor 312.

Data storage 304 is coupled with each module (i.e., each component) of processing system. Specifically, data storage 304 is coupled with each of CNN trainer 306, CNN executer 308, graph producer 310 and image processor 312 for enabling the different modules of system 300 to store and retrieve data. It is noted that all components of processing system 302 can be embedded on a single processing device or on an array of processing devices connected there-between. For example, components 306-312 are all embedded on a single graphics processing unit (GPU) 302, or a single Central Processing Unit (CPU) 302. Data storage 304 can be any storage device, such as a magnetic storage device (e.g., Hard Disc Drive—HDD), an optic storage device, and the like.

CNN trainer 306 retrieves a CNN architecture and a training image data set from data storage 304 or from another external data source. CNN trainer 306 executes the CNN on any of the images of the training image data set, and accordingly trains the CNN. CNN trainer stores the trained CNN on data storage 304.

CNN executer 308 retrieves the trained CNN from data storage 304 and further retrieves an input image to be represented as a graph. CNN executer 308 applies the convolutional layers of the trained CNN (i.e., the trimmed CNN) to the input image and stores the output of the convolutional layers onto data storage 304. That is, CNN executer stores at least the 3D output matrix of the last convolutional layer onto data storage 304.

Graph producer 310 retrieves the output matrix from data storage 304. Graph producer 310 produces a graph that represents the input image. In particular, graph producer 310 backtracks the receptive fields for the filters of the last convolutional layer applied on the input image. Graph producer 310 defines a graph vertex for each of the backtracked receptive fields. Graph producer 310 defines for each vertex a descriptor. Graph producer 310 defines the Z vector $(x,y,Z)$ of the output matrix as the descriptor for a vertex defined by a receptive field indicated by coordinates $(x,y)$.

Graph producer 310 determines the edges of the graph by applying an operator on the vector descriptors of the vertices. For example, the edge between vertices $(x_1,y_1)$ and $(x_2,y_2)$ is determined by the inner product of the respective descriptor vectors $(x_1,y_1,Z) \leftrightarrow (x_2,y_2,Z)$. Alternatively, the edges can be determined by applying other operators. Graph producer 310 stores the graph representing the input image on data storage 304.

Image processor 312 employs the graph representations of the images on data storage 304 for performing a visual task, such as image retrieval. For example, system 300 receives a query image. Processing system 302 produces a graph representation for the query image and stores the query graph on storage device 304. Image processor 312 determines the similarity (or the distance) between the query graph and the graphs representing the images on storage device 304, and retrieves the images most similar to the query image accordingly. The image similarity can be determined, for example, by graph matching techniques.

It is noted that system 300, operated in according to any one of the embodiments described in this application, provides an efficient manner for representing images as graphs, and accordingly for determining image similarity. System 300 (and of the methods of the various embodiments herein) are efficient both in terms of computational resources, and in terms of similarity determination (i.e., showing good results).

In the examples set forth herein above with reference to FIGS. 1A-1F, 2 and 3, the method and system of the disclosed technique were exemplified by a CNN. However, the disclosed technique is not limited to CNNs only, and is applicable to other artificial neural networks as well. In such cases the neural network (e.g., a feed-forward neural network, or any other configuration of artificial neural network) is trained. The locally connected layers of the network are applied onto an input image. Thus, as the applied layers are only locally connected, the receptive fields within the input image can be backtracked. It is noted that the receptive fields are a characteristic of the trained network, and are not dependent on the input image (i.e., the receptive fields are similar to all input images). The receptive fields of the last convolutional layer are defined as vertices, and the vectors of values given to the receptive fields by the filters of the last layers are defined as descriptors for the vertices. The edges are determined by applying an operator on the descriptor vectors. Thereby, the systems and methods of the disclosed technique represent the input image as a graph by applying an artificial neural network on the input image.

It will be appreciated by persons skilled in the art that the disclosed technique is not limited to what has been particularly shown and described hereinabove. Rather the scope of the disclosed technique is defined only by the claims, which follow.

The invention claimed is:

1. A method for producing a graph representation of an input image, the method comprising the procedures of:
    applying convolutional layers of a trained convolutional neural network on said input image;
    defining a receptive field of a last convolutional layer of said trained convolutional neural network as a vertex of said graph representation;
    defining a vector of a three dimensional output matrix of said last convolutional layer that is mapped to said receptive field as a descriptor for said vertex; and
    determining an edge between a pair of vertices of said graph representation by applying an operator on a pair of descriptors respective of said pair of vertices.

2. The method according to claim 1, further comprising a procedure of employing said graph representation of said input image for performing a visual task.

3. The method according to claim 1, wherein said procedure of determining an edge further comprises a sub-procedure of scaling said edge according to a distance between said vertices of said pair of vertices.

4. The method according to claim 1, wherein only a portion of said convolutional layers are applied on said input image.

5. The method according to claim 1, further comprising a procedure of applying at least one fully connected layer of said trained convolutional neural network on said input image after said procedure of applying convolutional layers, and further comprising a procedure of backtracking an output of said at least one fully connected layer to said last convolutional layer.

* * * * *